April 5, 1966   J. D. WILSON   3,244,089
HOLDER AND SQUEEZER FOR LEMON WEDGES
Filed March 16, 1964

LEMON WEDGE

John D. Wilson
INVENTOR.

BY *Clarence A. O'Brien*
and *Harvey B. Jacobson*
Attorneys

United States Patent Office 3,244,089
Patented Apr. 5, 1966

3,244,089
HOLDER AND SQUEEZER FOR LEMON WEDGES
John D. Wilson, Shreveport, La.
(1837 W. Jefferson St., Grand Prairie, Tex.)
Filed Mar. 16, 1964, Ser. No. 352,207
5 Claims. (Cl. 100—133)

The present invention relates to an easy-to-handle manually actuable implement which is expressly adapted to hold a segmental lime or lemon wedge, compress and squeeze the same, and conveniently utilize the extracted juice in a glass of iced tea, on cooked fish, vegetables and the like.

Anyone conversant with the art to which the present invention relates is aware that lemon slice holders and juice extractors are old and well known. They are usually constructed like tweezers, tongs with inherent properties to spread the gripping jaws apart, and are generally equipped with gripping and squeezing jaws of one type or another. It is common practice, too, to provide the tool or implement with a hook or the like whereby when it is not at the moment in use it can be hooked over the edge of the mouth of the drinking glass. Such a tool, exemplary of the state of the art, is disclosed in a patent to Morris 3,027,826 of April 3, 1962 to which reference, if desired, may be made.

The general objective of the present invention is to improve upon prior art lemon holding and squeezing tools and implements and, in doing so, to provide a construction which features significant improvements. One improvement resides in the provision of a holding and squeezing tool which is characterized by a pair of spring-biased hingedly connected levers having like or corresponding ends, the spring tensioned hinge functioning to normally move the jaw portions, at the outer free ends of the levers, toward each other and to assist in enabling the user to simply open the jaws, chuck the wedge or slice therebetween and let go, whereby the spring loaded jaws hold the wedge in a position for ready squeezing and expressing of the juice therefrom in an approved and sanitary manner.

Another improvement resides in providing a holder and squeezer which features a segmental or a similarly shaped shield. This shield is mounted on and at right angles to one lengthwise edge of one jaw, spans the space between the jaws and, in fact, constitutes a guard or shield in that it spreads over the pulp portion of the lemon and effectually guards against accidental squirting of the juice in an undesirable manner and direction. Accordingly, this shield constitutes a simple juice interceptor and guards against undesirable juice squirting and accidental damage to garments as might otherwise occur.

Then, too, this unique implement is provided on the levers with suitably placed and constructed hooks constituting selectively usable clips. These clips can be releasably fitted over the lip of the mouth portion of the drinking glass, in a manner to suspend the implement in a readily detachable and ready-to-use position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
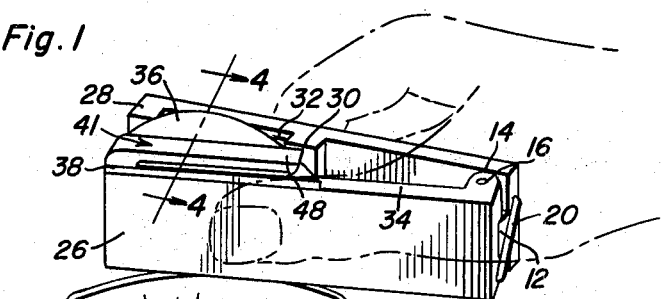
FIGURE 1 is a view in perspective showing a fragmentary portion of an iced drink, for example, iced tea and, what is more important showing the lemon wedge holding and squeezing tool or implement and how it is constructed and generally used.
Figure 2:
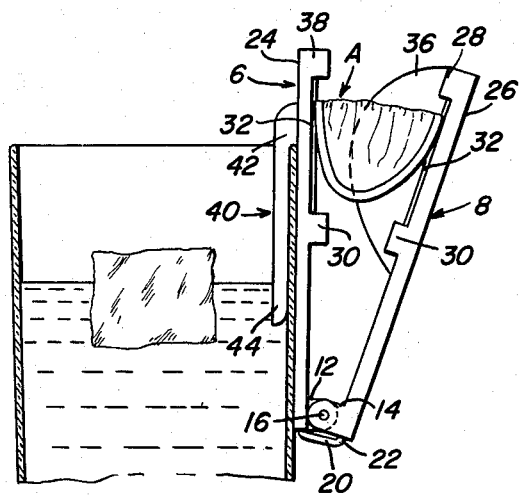
FIGURE 2 is a view based on FIGURE 1 with the glass shown in section and illustrating how one attaching clip is employed and further showing the jaw portions of the two levers spread apart and holding the lemon wedge readied to be used in the manner shown in FIGURE 1.
Figure 3:
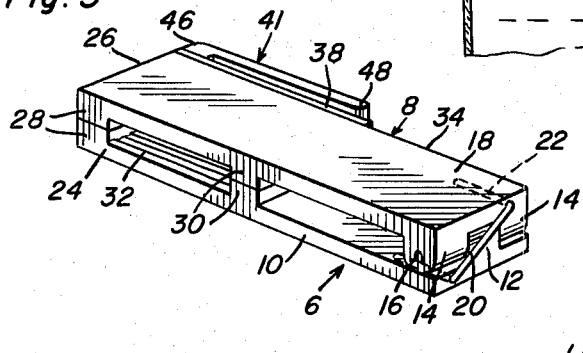
FIGURE 3 is a view in perspective of the implement or tool by itself and which brings out the fact that the inherent tension of the spring at the hinged end tends to and does press the jaws of the two levers normally toward each other.

One lever or unit, the one at the bottom in FIG. 3, is denoted by the numeral 6 and the companion lever or unit, the one at the top, is denoted by the numeral 8. Each lever comprises a generally rectangular rigid elongated plate. The lower plate 10 has a single central hinging and assembling kunckle 12 at the righthand end (FIG. 3). This knuckle serves to accommodate similar straddling companion hinging knuckles 14, the several knuckles being joined together by a pivot or hinge pin 16 which passes through said knuckles. The hinged ends of the two plates or levers, that is the end portions 18 are flush and are assisted in their coaction through the aid of a diagonal suitably constructed spring 20 having forward lateral ends or end portions 22 anchored in the respective lever-ends. The inherent resiliency, manner of anchorage and position of the spring functions to normally press the free swingable jaw-ends 24 and 26 together. More specifically the jaw-ends are provided with transverse block-like abutments 28 which coact with similar abutments 30 in limiting the approach of the jaws to each other. The abutments 28 are limit stops at the lefthand end portions of the two jaws 6 and 8 while the abutments 30 are spacing and limit stops for the median jaw portions. The opposed inwardly disposed surfaces of the jaws are longitudinally ribbed or otherwise milled as denoted at 32 and these milled surfaces assist one in positioning and holding the slice or lemon wedge A in place (FIG. 2). It will be understood that the expression "wedge" is used here to refer to a segmental portion of a lime or, as it is frequently the case, a slice of a lemon. It will be noted that the longitudinal edge portion 34 is provided on the forward portion with a sector-shaped or an equivalent segmental rigid shield 36. An edge portion of the shield is superimposed on and secured to the edge of the jaw as at 38. The shield is sufficiently long and wide that it spans the space between the two jaws when the two jaws are caused to approach each other to a point where the lemon wedge A is acted on and the juice is squeezed and extracted therefrom.

Anyone who enjoys lemon juice on fish, tomatoes, lettuce, salads or iced tea or similar beverages can aptly and effectively do so with the aid of the hand-held implement herein shown and described. It enables one to skillfully and readily handle a lemon wedge or the like without the slightest degree of embarrassment. Not only does it minimize the likelihood of having to use one's fingers for lemon squeezing, it prevents the fingers from becoming sticky and reduces squirting and splashing to an acceptable minimum. In addition to the above it offers a ways and means to guard against embarrassment of soiling one's apparel or the apparel of others occupying the same table. Further, it provides surfaces which can be aptly employed to carry and display advertising media. The fact that the construction is simple and practical it will be evident that the working parts are open and out of the way of each other so that visual inspection is had for sanitary handling, washing and drying. Stated otherwise, the implement well serves the purposes for which it is intended and should appeal to manufacturers, retailers and users.

Figure 4:
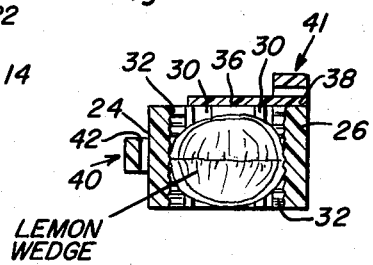
FIGURE 4 is a transverse or cross-sectional view taken on the plane of the section line 4—4 of FIGURE 1.
Figure 5:
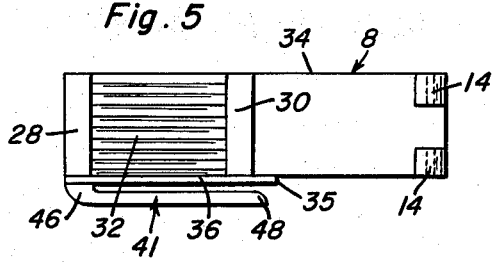
FIGURE 5 is a plan view of one lever unit, the one which is provided with the attached laterally projecting anti-splash shield or guard.

It is within the purview of the invention to provide appropriate clip means and to utilize the same, in the manner shown for example in FIG. 2, for hooking or clipping the lemon wedge holder and squeezer over the wall or mouth portion of the drinking glass or other receptacle. In carrying out this aspect of the concept two hooks or clips are provided. One clip is denoted by the numeral 40 the shank portion 42 being integrally jointed with a cooperating median portion of the jaw portion 24. The free lower end of the clip or hook is appropriately rounded as denoted at 44 to assist in readily applying and removing the hook or clip. Then, too, and to add to the easily supportable aspect of the invention a second hook 41 is provided. This hook is like the already described hook 40 in that it comprises a shank 46 which is integral with an exterior surface portion of the sector-shaped shield 36. The resilient terminal or free end portion 48 terminates short of the end portion 35 of the shield. In this case the shield and hook provide means for clipping the device on a drinking glass in the manner shown. It is also clear that one hook or clip could be employed in lieu of two clips with the selected position of that particular clip assuming either of the two positions illustrated in FIG. 4 for example. This aspect of the concept is not shown in the drawing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A manually usable implement for temporarily holding a fresh lemon wedge, squeezing it, and thus expressing the juice for use in iced tea comprising a pair of levers having like ends hingedly joined and opposite ends free of connection and providing a pair of wedge holding and squeezing jaws, spring means cooperable with said hingedly joined ends and functioning to spring-bias the jaws toward each other, said levers being rigid, generally rectangular in plan and linearly straight from end to end, the aforementioned hinged like ends being provided with cooperating aligned knuckles, said knuckles being interconnected and pivotally joined by a pivot pin extending therethrough, said spring means comprising a single spring extending across the hinged ends diagonally in relation to the plane of the adjacent ends and having its terminal ends anchored in the end portions adjacent thereto, and an anti-splash shield fixed on and carried by one jaw and lateral to and adapted to bridge the space between said jaws when they are forced to approach each other during the squeezing step.

2. A manually usable implement for holding a fresh lemon wedge, squeezing it, and expressing the juice for use comprising: a pair of levers having like ends hingedly joined together and opposite ends free of connection and constituting and providing a pair of wedge holding and squeezing jaws, spring means carried by and cooperable with said hingedly joined ends and spring-biasing the jaws toward each other, and an anti-splash shield fixed on and carried by one jaw and lateral to and adapted to bridge the space between said jaws when they are forcibly pressed together during the wedge squeezing step, said levers being rigid, elongated and straight from end to end and provided on opposed inwardly disposed faces with engageable abutments acting as limit stops, and said shield being segmental in plan and disposed in a plane at right angles to the plane of operation of said one jaw.

3. A manually usable implement for holding a fresh lemon wedge, squeezing it, and expressing the juice for use comprising: a pair of levers having like ends hingedly joined together and opposite ends free of connection and constituting and providing a pair of wedge holding and squeezing jaws, spring means carried by and cooperable with said hingedly joined ends and spring-biasing the jaws toward each other, and an anti-splash shield fixed on and carried by one jaw and lateral to and adapted to bridge the space between said jaws when they are forcibly pressed together during the wedge squeezing step, said levers being rigid and provided on opposed inwardly disposed faces with releasably engageable abutments acting as limit stops, said shield being segmental in plan and disposed in a plane which is at right angles to the plane of operation of said one jaw, and a hook fixed on and carried by one of said levers, said hook cooperating with said one lever in providing an implement attaching and retaining clip.

4. A manually usable implement for holding a fresh lemon wedge, squeezing it, and expressing the juice for use comprising: a pair of levers having like ends hingedly joined together and opposite ends free of connection constituting and providing a pair of wedge holding and squeezing jaws, spring means carried by and cooperable with said hingedly joined ends and spring-biasing the jaws toward each other, and an anti-splash shield fixed on and carried by one jaw and lateral to and adapted to bridge the space between said jaws when they are forcibly pressed together during the wedge squeezing step, said levers being elongated, straight from end to end and rigid and having opposed inwardly disposed longitudinally flat faces provided with paired oriented releasably engageable abutments constituting and providing limit stops, said shield being segmental in plan and disposed in a plane at right angles to the plane of said one jaw, a first hook fixed on and carried by said one jaw, said hook being resilient and providing an implement attaching and retaining clip, and a second hook having one end fixed on and carried by the other jaw and likewise being resilient and providing an optionally usable implement attaching and retaining clip, whereby either of the clips can be brought into use in keeping with the requirements of the user.

5. An implement for temporarily holding a fresh lemon wedge, squeezing it and expressing the juice for use in iced tea or for whatever purpose desired comprising: a pair of levers having like ends hingedly joined and opposite ends free of connection and provided with flat faces constituting and providing a pair of wedge holding and squeezing jaws, spring means carried by and cooperable with said hingedly joined ends and functioning to spring-bias the jaws toward each other, an anti-splash shield fixed on and carried by one jaw, disposed at right angles to and capable of bridging the space between said jaws when they are caught hold of with one's fingers and are forcibly pressed together during the squeezing step, and temporary storing means mounted on said implement, said means comprising at least one elongated resilient hook having a free end portion and a shank portion integral with that part of said implement on which it is mounted.

References Cited by the Examiner

UNITED STATES PATENTS

| 659,346 | 10/1900 | King | 100—234 |
| 1,305,806 | 6/1919 | Keppeler | 100—234 X |
| 3,027,826 | 4/1962 | Morris | 100—234 X |

FOREIGN PATENTS

| 68,639 | 7/1915 | Switzerland. |

WALTER A. SCHEEL, *Primary Examiner.*

LOUIS O. MAASSEL, *Examiner.*